US012675278B2

(12) United States Patent
Prasad et al.

(10) Patent No.: US 12,675,278 B2
(45) Date of Patent: Jul. 7, 2026

(54) CLOUD-FRIENDLY AUTOMATED DECLARATIVE UPDATE DEPLOYMENT

(71) Applicant: DELL PRODUCTS L.P., Round Rock, TX (US)

(72) Inventors: Parmeshwr Prasad, Bangalore (IN); Raveendra Babu Madala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 185 days.

(21) Appl. No.: 18/483,650

(22) Filed: Oct. 10, 2023

(65) Prior Publication Data

US 2025/0117207 A1     Apr. 10, 2025

(51) Int. Cl.
    *G06F 8/65*          (2018.01)
(52) U.S. Cl.
    CPC ..................................... *G06F 8/65* (2013.01)

(58) Field of Classification Search
    CPC .................................................. G06F 8/61–65
    See application file for complete search history.

(56) References Cited

U.S. PATENT DOCUMENTS

| | | | |
|---|---|---|---|
| 11,509,715 B2 | 11/2022 | Rafey et al. | |
| 11,675,678 B1 | 6/2023 | Sharma et al. | |
| 11,677,716 B2 | 6/2023 | DiRosa et al. | |
| 2019/0369980 A1* | 12/2019 | Mair ....................... | H04L 67/10 |
| 2021/0255846 A1* | 8/2021 | Mamgain ................ | H04L 67/34 |
| 2023/0065431 A1* | 3/2023 | Kumar .................... | G06F 9/445 |
| 2023/0123350 A1 | 4/2023 | Panikkar | |
| 2023/0129530 A1* | 4/2023 | Negoshian ............. | G06Q 40/12 |
| | | | 717/170 |
| 2023/0236897 A1 | 7/2023 | Kumar et al. | |

* cited by examiner

*Primary Examiner* — Duy Khuong T Nguyen
(74) *Attorney, Agent, or Firm* — Larson Newman, LLP

(57)     ABSTRACT

An information handling system detects a registration of a specification for an update resource, and generates an update object according to a request, wherein the update object is an instance of the update resource. The system triggers an update process for a containerized application installed in a node using the update object.

20 Claims, 5 Drawing Sheets

Information Handling System

102
Processor

104
Processor

134
Video
Display

120
Memory 110
122

106
Chipset 108
132

130
136
Graphics
Interface

112

140
NVRAM
142
BIOS/
EFI

192

170
I/O
Interface

150
Disk
Controller

176
TPM

180
Network
Interface

174
Add-On
Resource

172

156
ODD

152

154
HDD

190
BMC

182

194

160
Disk
Emulator 164
162

Solid
State Drive

200

Cluster Manager 205

Controller 210     Update Operator 215

Update Applicator 220

Stager 225

Inventory

Registry

Compliance

Artifact Creation

Update

Node 230-1

Application 235-1     Firmware 240-1

Update Object 250-1

Node 230-2

Application 235-2     Firmware 240-2

Update Object 250-2

Node 230-3

Application 235-3     Firmware 240-3

Update Object 250-3

Node 230-n

Application 235-n     Firmware 240-n

Update Object 250-n

Cluster 260

300

```
spec:
  description: Firmware update: Defines a desired state of an update process
  properties:
    endpoint:
      type: string
    frequency:
      type: integer
    host:
      description: Information of a host to be updated
      properties:
        ip:
          type: string
        user:
          type: string
      type: object
    idrac:
      description:
      properties:
        ip:
          type: string
        pass:
          type: string
        user:
          type: string
      type: object
    inventoryModulePath:
      type: string
    registryIP:
      type: string
    remote:
      type: Boolean
```

CLOUD-FRIENDLY AUTOMATED DECLARATIVE UPDATE DEPLOYMENT

FIELD OF THE DISCLOSURE

The present disclosure generally relates to information handling systems, and more particularly relates to cloud-friendly automated declarative update deployment.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system detects a registration of a specification for an update resource, and generates an update object according to a request, where the update object is an instance of the update resource. The system triggers an update process for a containerized application installed in a node using the update object.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a specification for creating a custom update resource and/or an update object, according to an embodiment of the present disclosure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include a I²C bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I²C and the like. Additional components of information handling system 100 can include one or more storage devices that can store machine-executable code, one or more communications ports for communicating with external devices, and various input and output (I/O) devices, such as a keyboard, a mouse, and a video display. For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Updates are provided from time to time to address or fix certain issues and/or to enhance functionality. To effectively support the products, a manufacturer provides updates to updateable components in the products and services it supplies. The manufacturer typically identifies or discovers vulnerabilities either independently or with the help of others. The manufacturer then offers advice on how to manage, correct, and/or mitigate vulnerabilities. To serve the ever-growing data center operating environment preparation and operation needs, automated operating environment preparation is desirable. Data center providers generally are adopting web services in providing infrastructure as a service and platform as a service for various solutions due to the inherent geographical distribution of data centers. Operating environments typically require the updateable components to be at a certain revision level. Operating environments are to be protected against known vulnerabilities due to the increasing exploitation of vulnerabilities in updateable components.

Available cloud-friendly update solutions typically depend on multiple steps that include determining updateability, creating update bundles, determining drift, and applying the update. If any step fails there is typically no consistent way to propagate the error to its caller function. Also, there is currently no solution that tries to bring a system to a desired state when the update fails. In addition, cloud-friendly update solutions typically do not support automatically scaling updates. To address these and other concerns, the present disclosure provides a system and method for cloud-friendly automated declarative software application and firmware update deployment.

Figure 2:
FIG. 2 is a block diagram of an environment for a cloud-friendly automated declarative update deployment, according to an embodiment of the present disclosure.

FIG. 2 shows an environment 200 for a cloud-friendly automated declarative software application and firmware update deployment. Environment 200 includes a cluster manager 205 and a cluster 260. Cluster manager 205 includes a controller 210, an update operator 215, and an update applicator 220 which includes a stager 225. Cluster 260 includes nodes 230-1 through 230-n. The components of environment 200 may be implemented in hardware, software, firmware, or any combination thereof. The components shown are not drawn to scale and environment 200 may include additional or fewer components. In addition, connections between components may be omitted for descriptive clarity.

Environment 200 may be a container orchestration environment that includes one or more clusters. The clusters may be located on-premise or remote, such as at a cloud. Each cluster includes at least one server also referred to as a host or node that is similar to information handling system 100 of FIG. 1. Each node may run one or more containerized applications and/or firmware. Containers may be implemented using a container orchestration system, such as Kubernetes®. Types of containers that may be implemented or otherwise adapted within a container orchestration system include Docker® containers or other types of Linux® containers or Windows® containers. While the Kubernetes® container orchestration system may be used to illustrate various embodiments, it is to be understood that alternative container systems can be utilized.

At certain points in time, an update object may be created for updating the containerized applications and/or firmware. After applying the updates to the containerized applications and/or firmware, the update object may be deleted. For example, a node 230-1 includes an application 235-1, a firmware 240-1, and an update object 250-1. A node 230-2 includes an application 235-2, a firmware 240-2, and an update object 250-2. A node 230-3 includes an application 235-3, a firmware 240-3, and an update object 250-3. A node 230-n includes application 235-n, a firmware 240-n, and an update object 250-n.

Cluster manager 205 may be configured to monitor, control, and/or manage one or more clusters, such as cluster 260. Update operator 215 may be configured to receive input from a user and may parse the input received while update applicator 220 and stager 225 may be configured to handle an update process. In one embodiment, update applicator 220 may receive a notification that a specification is registered by the user. Upon receipt of the notification, cluster manager 205 or update operator 215 in particular may create and add an update resource to cluster 260. The update resource may be a custom resource which is an extension of a container API installation. In other words, the update resource may be created through a dynamic registration of a custom resource definition, also referred to as a custom specification.

Cluster manager 205, or update operator 215 in particular, may also create an update object 250 which represents an instantiation of the update resource. One update object may created for each node. Update objects 250 may be created, updated, and/or deleted through a container orchestration system API or a command line tool and persisted into a database. Update object 250 may be used to automate and scale application and/or firmware updates to applications 235 and/or firmware 240 of cluster 260. The update process may also be scaled to the other applications and/or firmware in other nodes of other clusters(s). The application and firmware update process may include several operations, such as an inventory operation, a registry operation, a compliance operation, an artifact creation operation, and an update operation. Although each update object follows the same definition according to the specification, each update object may include different parameters and/or values.

The inventory operation may be used to identify and get the status of applications 235 and/or firmware 240. The registry operation may be used to store information associated with the inventory and compliance operations. The compliance operation may be used to evaluate compliance between particular application and/or firmware requirements and updates received. The evaluation includes analyzing update packages to collect information to determine whether a particular update package matches certain criteria for the application and/or firmware. The artifact operation may be used to create an artifact, which includes an update package and catalog for the update operation. The update operation applies the updates to applications 235 and/or firmware 240.

Controller 210 may be configured to monitor, manage, and/or control the state of update object 250. For example, when controller 210 detects the generation of the update object(s), controller 210 may monitor the status of an update process and/or each of the operations associated with each of the update object(s). Controller 210, also referred to as a loop controller, may also be configured to process a control loop reconciliation event, such as to reconcile a current state of update object 250 to match a desired state. In particular, controller 210 may be configured to reconcile the current state of the update process and/or each operation associated with the update object to its desired state. For example, controller 210 may create a control loop that allows each operation to reconcile itself.

In another embodiment, controller 210 may include a sub-controller for each operation. For example, controller 210 may include an inventory sub-controller, a registry sub-controller, a compliance sub-controller, an artifact sub-controller, and an update sub-controller. In this embodiment, each sub-controller may create a control loop for its associated operation to reconcile itself.

FIG. 3 shows a specification 300 to create a custom update resource and/or an update object. Specification 300 includes information associated with the custom update resource and/or the update object to be created. In one embodiment, specification 300 provides an input or information required to update a server or node in a cluster. For example, specification 300 includes information about a host where the update process may be executed, such as its internet protocol address and a username and password for the update, etc. The specification may include one or more endpoint uniform resource locators (URLs), that provide information about an application or firmware. Each endpoint URL may be associated with a different behavior of the application or the firmware. The specification may also include a registry internet protocol address where the information can be stored in a persistent storage, such as a database, a file, etc. Specification 300 may also include an internet protocol address of a node or a management controller similar to BMC 190 of FIG. 1.

In addition, specification 300 provides a description of an output or a desired state of the update resource and/or the update object. Specification 300 may be created in advance by a user prior to the update programmatically or using a command line interface. Specification 300 may be one of several formats that include a Yet Another Multicolumn Layout (YAML), JavaScript Object Notation (JSON), etc. The custom update resource may be used to update one or more applications in one or more nodes of a cluster. The update resource may also be used to update applications in more than one cluster.

Figure 4:
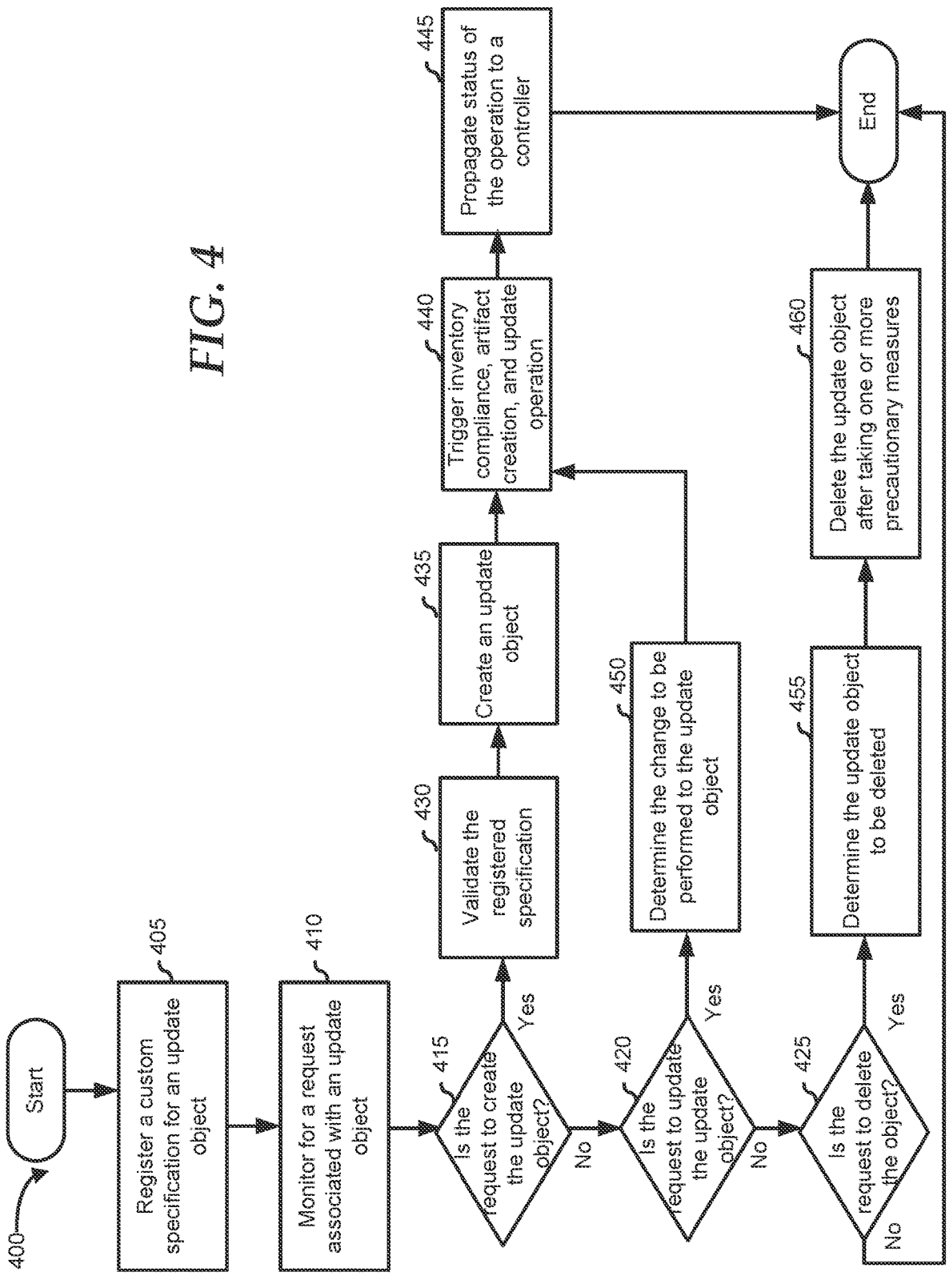
FIGS. 4 and 5 are flowcharts of methods for a cloud-friendly automated declarative update deployment, according to an embodiment of the present disclosure.

FIG. 4 shows a flowchart of a method 400 cloud-friendly automated declarative software application and firmware update deployment. Method 400 may be performed by one or more components of environment 200 of FIG. 2. However, while embodiments of the present disclosure are described in terms of environment 200 of FIG. 2, it should be recognized that other systems may be utilized to perform the described method. One of skill in the art will appreciate that this flowchart explains a typical example, which can be extended to advanced applications or services in practice.

Method 400 typically starts at block 405 where a cluster manager or an update operator may be used to register a custom specification, such as specification 300, by a user. The user may register the custom specification to generate the update resource and/or the update object which may be used in updating an application or firmware installed in a server. The custom specification may be registered program-matically using APIs and/or a command line interface. Once the specification is registered, then an instance of the resource can be generated. The method may proceed to block 410.

At block 410, the cluster manager or the update operator in particular may create a controller to watch or monitor a create, read, update, and delete (CRUD) request associated with the update object. When the controller receives one of the CRUD requests the method proceeds to decision block 415. At decision block 415, the cluster manager may deter-mine whether the request is to create the update object. If the request is to create the update object, then the "YES" branch is taken and the method proceeds to block 430. If the request is not to create the update object, then the "NO" branch is taken and the method proceeds to decision block 420. The request may include information regarding the clusters on which the update object is to be created, such as a location, configuration, internet protocol address, a BMC internet protocol address, and service tag of each one of the clusters and/or its nodes.

At decision block 420, the cluster manager may determine whether the request is to update the update object. If the request is to update the update object, then the "YES" branch is taken and the method proceeds to decision block 425. If the request is not to update or change the update object, then the "NO" branch is taken and the method proceeds to decision block 450. At decision block 425, the method may determine whether the request is to delete the update object. If the request is to delete the update object, then the "YES" branch is taken and the method proceeds to block 455. If the request is not to delete the update object, then the "NO" branch is taken and the method ends.

At block 430, the cluster manager or the update operator in particular may validate the registered specification. The specification may include information regarding the appli-cation's or firmware's desired state. For example, the speci-fication may include the desired version of the application or firmware. The specification may also include a URL from where the update packages may be downloaded and which update package to use. The specification may be validated based on one or more policies. For example, the policy can state which specific endpoint URL or which particular update package to use. The method may proceed to block 435.

At block 435, the cluster manager may create an update object that represents an instance of the custom resource described in the specification. In one embodiment, an update object may be created for each node in the cluster(s), thus effectively scaling the update process to each node in the cluster(s). The method proceeds to block 440. At block 440, the cluster manager, an update applicator, or a stager, in particular, may trigger each of the update objects to perform at least one or all of an inventory operation, a compliance operation, an artifact creation operation, and an update operation. For example, the cluster manager may trigger the inventory operation to determine the applications and firm-ware installed in each node in the cluster.

The cluster manager may then trigger the inventory compliance information, wherein the method may determine a current list of application and firmware updates. The cluster manager may then create or generate an update artifact based on a delta between a current version of the application or firmware and the desired inventory based on the current list of application and firmware updates. For example, the cluster manager may generate an update cata-log and/or an update package. The cluster manager may then perform the update operation wherein the cluster manager may download the update package based on the update catalog. The operations may be performed in parallel on one or more nodes of one or more clusters. The method may proceed to block 445.

At block 445, a controller may propagate a status of each of the operations to a control loop associated with the controller. The controller may be generated by the cluster manager to monitor the status of each of the operations triggered by a node. In particular, a controller may be generated to monitor the operations of one or more nodes. Afterwards, the method ends.

At block 450, the cluster manager or the update operator in particular may determine the change to be performed on the update object. For example, the cluster manager may parse the update request received and then apply the change. The method may proceed to block 440. At block 455, the cluster manager or the update operator in particular may determine the update object to be deleted. For example, the cluster manager may parse the delete request to determine an object identifier associated with the update request. The method may proceed to block 460. At block 460, the cluster manager may delete the update object after taking one or more precautionary measures. For example, the cluster manager may stop the update process and/or operations currently running that are associated with the update object or wait until these operations are finished. Afterwards, the method ends.

Figure 5:
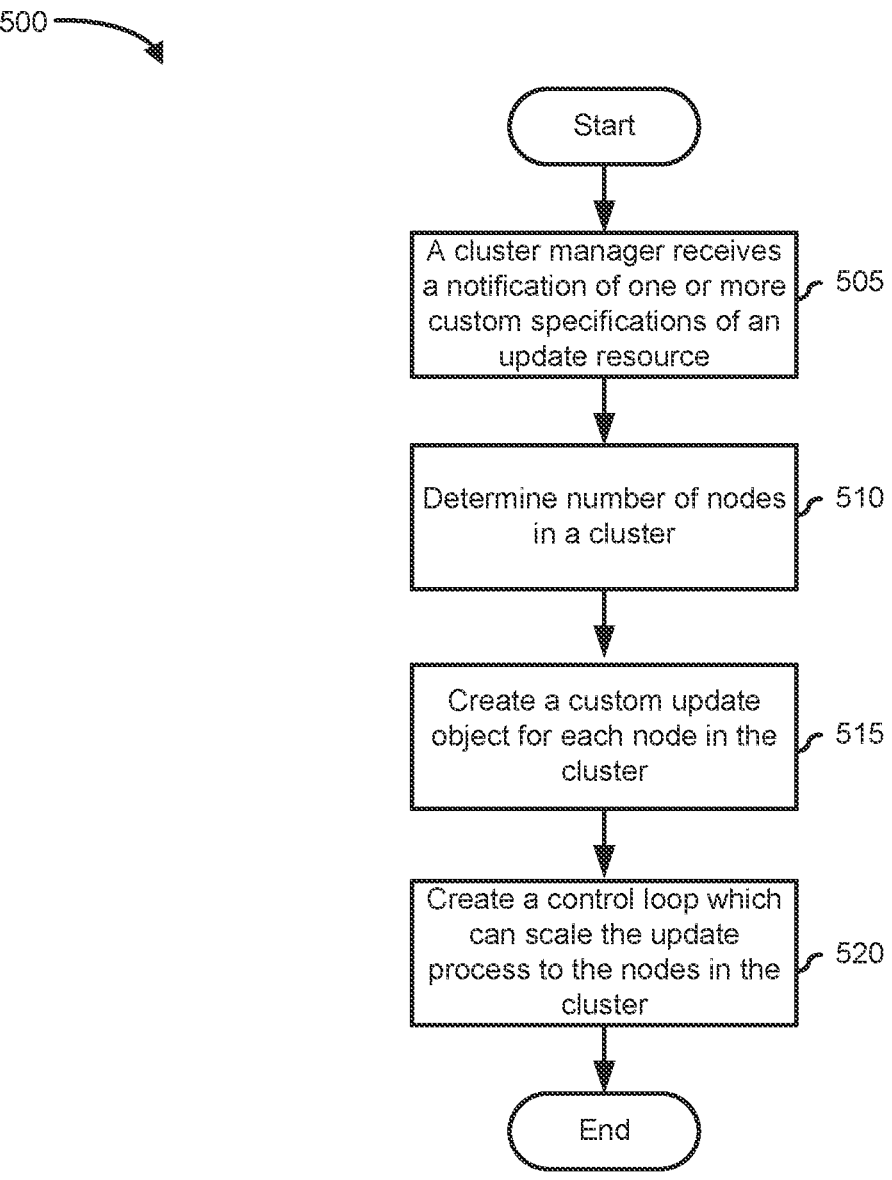

FIG. 5 shows a flowchart of a method 500 for a cloud-friendly automated declarative software application and firmware update deployment. Method 500 may be per-formed by one or more components of environment 200 of FIG. 2. However, while embodiments of the present disclo-sure are described in terms of environment 200 of FIG. 2, it should be recognized that other systems may be utilized to perform the described method. One of skill in the art will appreciate that this flowchart explains a typical example, which can be extended to advanced applications or services in practice.

Method 500 typically starts at block 505 where the cluster manager may notify a cluster manager of one or more custom specifications of an update resource. In one embodi-ment, the cluster manager may be notified when the speci-fication is registered at a container orchestration system. The update resource may be configured to perform different operations related to updating applications or firmware stored in one or more nodes in one or more clusters of the container orchestration system. Accordingly, the custom specification includes information about the different opera-tions, such as inventory, compliance, update, and artifact creation. For example, the specification may include a username and a password of a user authorized to create the update resource and/or an instance of the update resource. The specification may also include a location of a catalog, update package, etc. associated with the update resource.

At block 510, the cluster manager may determine the number of servers or nodes in one or more clusters. The cluster manager may also determine the applications and/or firmware in each node, such as their versions. The method proceeds to block 515 where the cluster manager may create a custom update object for each node in the cluster. The update object may be based on specification 300 of FIG. 3. The method may proceed to block 520.

At block 520, the method may create a control loop that understands the specification and can scale the update pro-cess and associated operations to each of the nodes in the cluster. The control loop may capture and trigger a reconcile loop. The control loop may also be used to expose an approach to query a status and/or scale of the update process or each of the operations associated thereof. For example, a control loop may be used to query a status of each of the operations of the update process such as the inventory operation, the registry operation, the compliance operation, the artifact creation operation, and the update operation. Each of the operations may be performed at every node in the cluster.

The reconcile loop may be used to reconcile a current state of the update process to a desired state. For example, if the desired state is to update the application from a first version to a second version, wherein the second version is the latest version of the application. If the status of the application after the update process is not equal to the desired version, then the reconcile loop may perform a retry of the update process. For example, the reconcile loop may retry by downloading the update package from another location or using a different update package. When the update process ends and the desired state of the application or firmware is attained, then the update object may be deleted. The update object may also be deleted and a notification transmitted to the user when the update process fails. The control loop and/or the reconcile loop may be monitored, managed, and/or controlled by a controller.

Although FIG. 4, and FIG. 5 show example blocks of method 400 and method 500 in some implementations, method 400 and method 500 may include additional blocks, fewer blocks, different blocks, or differently arranged blocks than those depicted in FIG. 4 and FIG. 5. Those skilled in the art will understand that the principles presented herein may be implemented in any suitably arranged processing system. Additionally, or alternatively, two or more of the blocks of method 400 and method 500 may be performed in parallel. For example, blocks 405 and 410 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

As used herein, a hyphenated form of a reference numeral refers to a specific instance of an element and the un-hyphenated form of the reference numeral refers to the collective or generic element. Thus, for example, node "230-1" refers to an instance of a node class, which may be referred to collectively as nodes "230" and any one of which may be referred to generically as a node "230."

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

detecting, by a processor, a registration of a specification for an update resource;

subsequent to the registration of the specification, generating a controller to monitor requests associated with an update object;

in response to the controller receiving a request to generate the update object, generating the update object according to the request subsequent to validating the specification, wherein the update object is an instance of the update resource according to the specification;

in response to determining that there is a change is to be performed on the update object triggering an update process for a containerized application installed in a node using the update object to apply the change;

querying a status of the update process to reconcile a current state of the update process to a desired state; and in response to the controller determining that the update process is complete and the current state of the update process is equal to the desired state based on the status of the update process, deleting the update object.

2. The method of claim 1, wherein the update resource is a custom resource that is an extension of an application programming interface of a container installation.

3. The method of claim 1, wherein the node includes a containerized firmware.

4. The method of claim 1, wherein each one of nodes in a cluster includes a particular update object.

5. The method of claim 1, further comprising validating the specification.

6. The method of claim 1, further comprising propagating the status of the update process to the controller.

7. The method of claim 1, further comprising reconciling the current state of the update process to the desired state.

8. The method of claim 1, further comprising applying the change to the update object according to another request.

9. The method of claim 1, further comprising deleting the update object according to another request after stopping the update process.

10. The method of claim 1, wherein the specification is in a JavaScript Object Notation format.

11. An information handling system, comprising:

a processor; and a memory storing code that when executed causes the processor to perform operations including:

detecting a registration of a specification for an update resource;

subsequent to the registration of the specification, generating a controller to monitor requests associated with an update object;

in response to the controller receiving a request to generate the update object, generating the update object according to the request subsequent to validating the specification, wherein the update object is an instance of the update resource according to the specification;

in response to determining that there is a change to be performed on the update object, triggering an update process for a containerized application installed in a node using the update object to apply the change;

querying a status of the update process to reconcile a current state of the update process to a desired state; and in response to the controller determining that the update process is complete and the current state of the update process is equal to the desired state on the status of the update process, deleting the update object.

12. The information handling system of claim 11, wherein the update resource is a custom resource that is an extension of an application programming interface of a container installation.

13. The information handling system of claim 11, wherein the node includes a containerized firmware.

14. The information handling system of claim 11, wherein each one of nodes in a cluster includes a particular update object.

15. The information handling system of claim 11, wherein the operations further comprise propagating the status of the update process to the controller.

16. A non-transitory computer-readable medium to store instructions that are executable to perform operations comprising:

detecting a registration of a specification for an update resource;

subsequent to the registration of the specification, generating a controller to monitor requests associated with an update object;

in response to the controller receiving a request to generate the update object, generating the update object according to the request subsequent to validating the specification, wherein the update object is an instance of the update resource;

in response to determining that there is a change is to be performed on the update object, triggering an update process for a containerized application installed in a node using the update object to apply the change;

querying a status of the update process to reconcile a current state of the update process to a desired state; and in response to the controller determining that the update process is complete and the current state of the update process is equal to the desired state based on the status of the update process, deleting the update object.

17. The non-transitory computer-readable medium of claim 16, wherein the operations further comprise applying the change to the update object according to another request.

18. The non-transitory computer-readable medium of claim 16, wherein the operations further comprise deleting the update object according to another request after stopping the update process.

19. The non-transitory computer-readable medium of claim 16, wherein the operations further comprise reconciling the current state of the update process to the desired state.

20. The non-transitory computer-readable medium of claim 16, wherein each one of nodes in a cluster includes a particular update object.

* * * * *